United States Patent
Wottke et al.

(10) Patent No.: US 9,592,903 B2
(45) Date of Patent: Mar. 14, 2017

(54) TELESCOPIC SEAT RAIL COVER

(71) Applicant: Airbus Operations GmbH, Hamburg (DE)

(72) Inventors: David Wottke, Hamburg (DE); Felix Lohan, Hamburg (DE)

(73) Assignee: Airbus Operations GmbH (DE)

( * ) Notice: Subject to any disclaimer, the term of this patent is extended or adjusted under 35 U.S.C. 154(b) by 19 days.

(21) Appl. No.: 14/546,155

(22) Filed: Nov. 18, 2014

(65) Prior Publication Data

US 2015/0145298 A1 May 28, 2015

(30) Foreign Application Priority Data

Nov. 22, 2013 (EP) .................... 13194040

(51) Int. Cl.
*B64D 11/06* (2006.01)
*B64C 1/18* (2006.01)
*B60N 2/07* (2006.01)

(52) U.S. Cl.
CPC .............. *B64C 1/18* (2013.01); *B60N 2/0725* (2013.01); *B64D 11/06* (2013.01); *B64D 11/0696* (2013.01)

(58) Field of Classification Search
CPC ....... B64D 11/0696; B64D 11/06; B64C 1/18; B60N 2/0725
See application file for complete search history.

(56) References Cited

U.S. PATENT DOCUMENTS

| | | | |
|---|---|---|---|
| 4,475,701 A * | 10/1984 | Martin | ............... B64D 11/0696 244/118.6 |
| 7,191,981 B2 | 3/2007 | Laib et al. | |
| 7,988,231 B2 | 8/2011 | Phinney | |
| 8,393,590 B2 * | 3/2013 | Kato | ............. B60N 2/0725 248/394 |
| 2006/0097109 A1 | 5/2006 | Laib et al. | |
| 2010/0052386 A1 | 3/2010 | Phinney | |
| 2011/0049296 A1 | 3/2011 | Roming et al. | |
| 2014/0349042 A1 * | 11/2014 | Schomacker | ...... B64D 11/0696 428/34.1 |

OTHER PUBLICATIONS

EP Search Report (EP 13194040.5) dated Apr. 17, 2014.
Chinese Office Action dated Jun. 2, 2016.

* cited by examiner

*Primary Examiner* — Tien Dinh
*Assistant Examiner* — Richard R Green
(74) *Attorney, Agent, or Firm* — Lerner, David, Littenberg, Krumholz & Mentlik, LLP

(57) ABSTRACT

A seat rail cover for a seat rail includes a first longitudinal section and a second longitudinal section. The first longitudinal section includes a first cover element and a first support element. The first support element extends in a longitudinal direction of the seat rail cover and protrudes from the first cover element transversely to the longitudinal direction. The second longitudinal section includes a second cover element and a second support element. The second support element extends in longitudinal direction and protrudes from the second cover element transversely to the longitudinal direction. The first longitudinal section is movable in longitudinal direction of the seat rail cover with respect to the second longitudinal direction from a non extended state to an extended state. Such a seat rail cover provides a variable length and may improve the dispersion of loads applied to the cover elements of the seat rail cover.

14 Claims, 3 Drawing Sheets

TELESCOPIC SEAT RAIL COVER

FIELD OF THE INVENTION

The invention relates to seat rail covers for seat rails in an internal room or a passenger cabin of a means of transport, a seat arrangement with such a seat rail cover, and an aircraft with such a seat arrangement.

BACKGROUND OF THE INVENTION

Seat rails may be arranged such as to mechanically couple one or more seats with a passenger cabin and in particular with structural elements located at the floor of a passenger cabin. A seat rail permits longitudinal movement of the seats arranged along and coupled to the seat rail such that a seat configuration and in particular a longitudinal distance between adjacent seats can be adapted. Hence, the seat rail longitudinally extends in direction of the desired movement direction of the seats coupled to the seat rail.

A seat rail cover may be used for covering a seat rail as to avoid intrusion of particles such as dirt and dust, for example, in the crown of the seat rail which may impede the movement of a seat in the crown of the seat rail or may cause damage to the seat rail or the seat legs of seats attached to the seat rail.

Further, a seat rail cover may be used for providing a flat floor, i.e. a floor in a passenger cabin without a recess, a protrusion, or a gap, for example as a result of the crown of the seat rail.

US 2011/0049296 A1 describes a seat rail for attaching seats to the floor of a passenger cabin in an aircraft.

US 2006/0097109 A1 describes an adjustable seat track cover with a cable channel for routing a cable within the seat track cover.

BRIEF SUMMARY OF THE INVENTION

There may be a need to provide a flexible seat rail cover which provides an increased mechanical strength and stability.

According to a first aspect, a seat rail cover for a seat rail is provided. The seat rail cover comprises a first longitudinal section and a second longitudinal section. The first longitudinal section comprises a first cover element and a first support element. The first support element extends in a longitudinal direction of the seat rail cover and protrudes from the first cover element transversely to the longitudinal direction. The second longitudinal section comprises a second cover element and a second support element. The second support element extends in longitudinal direction and protrudes from the second cover element transversely to the longitudinal direction. The first longitudinal section is movable in longitudinal direction of the seat rail cover with respect to the second longitudinal direction from a non extended state to an extended state.

A seat rail cover as described above and hereinafter permits covering a seat rail of a seat arrangement in such a manner that a distance between adjacent seats, i.e. between two seats arranged one behind the other with respect to the longitudinal direction, can be adjusted or adapted and the same seat rail cover can be used for covering varying lengths of the seat rail between two adjacent seats.

The first longitudinal section and the second longitudinal section are movable with respect to each other according to the telescopic principle, i.e. the seat rail cover has a contracted state with the minimum length of the seat rail cover, an extended state with the maximum length of the seat rail cover, and a multitude of intermediate states in which the length of the seat rail cover is longer than the minimum length and shorter than the maximum length of the seat rail cover.

The length of the first longitudinal section may be identical to the length of the second longitudinal section. In this case, when moving one of the first and second longitudinal sections such that it completely overlaps the other one of the first and second longitudinal sections, the length of the seat rail cover in the contracted state corresponds to the length of any one of the first or second longitudinal section.

In one embodiment, the first longitudinal section and the second longitudinal section are continuously movable, i.e. stepless movable, with respect to each other.

In one embodiment, the seat rail cover comprises a first end section and a second end section which are mechanically attachable to seats adjacent to each other. In this embodiment, the length of the seat rail cover may be automatically adjusted in case a seat of the adjacent seats is moved along the longitudinal direction of the seat rail.

In one embodiment, the first longitudinal section and the second longitudinal section are brought to a determined length of the seat rail cover and are mechanically fixed with respect to each other such that the seat rail cover is adjusted to said length. When mounting the seat rail cover to a seat rail, the position of the seat rail cover may be fixed with respect to the seat rail.

According to an embodiment, the first support element and the second support element continuously extend in longitudinal direction of the seat rail cover.

The first support element continuously extends along the first longitudinal section and the second support element continuously extends along the second longitudinal section of the seat rail cover.

Therefore, as the support elements continuously extend along the respective longitudinal section, loads applied to the respective cover element are being applied via the respective support element to the seat rail crown along the length of the first and second support element and the load distribution per area may be reduced.

According to a further embodiment, the first support element and the second support element continuously extend in longitudinal direction of the seat rail cover in the extended state of the seat rail cover.

In this embodiment, the first and second support element do not only continuously extend along the length of the respective cover element but in sum continuously extend in longitudinal direction of the seat rail cover. In other words, there is no gap or spacing between the first support element and the second support element.

The first support element may continuously extend along the complete length of the first longitudinal section and the second support element may continuously extend along the complete length of the second longitudinal section.

According to a further embodiment, the first support element and the second support element form an overlapping section in longitudinal direction of the seat rail cover in the extended state of the seat rail cover.

In the overlapping section, the first support element and the second support element extend along the longitudinal direction side by side with respect to each other, in other words, the first and second support element form the overlapping section where they are arranged side by side to each other in longitudinal direction of the seat rail cover.

The first support element and the second support element may be formed asymmetrically with respect to the longitudinal direction of the seat rail cover at least in a longitudinal section of the first and second support element, respectively, forming a first asymmetric longitudinal section and a second asymmetric longitudinal section of the first and second support element, respectively.

An asymmetric arrangement of a support element is to be understood as having a transversal offset with regard to the longitudinal centre axis of a cover element. In a symmetric arrangement the support element is symmetric with regard to a longitudinal centre axis of the respective cover element.

In a first end section of the first longitudinal section, the first support element may be symmetric with respect to a longitudinal direction of the seat rail cover. Similarly, in a second end section of the second longitudinal section, the second support element may be symmetric with respect to the longitudinal direction of the seat rail cover. In this embodiment, the first end section and the second end section may be arranged at opposite ends of the seat rail cover.

In this embodiment, the overlapping section of the first and second support element is formed by the asymmetrically formed sections of the first and second support elements. The symmetric sections of the first and second support elements may be aligned to each other with respect to the longitudinal direction of the seat rail cover, i.e., the symmetric sections of the first and second support elements have no transversal offset with respect to each other.

According to a further embodiment, the seat rail cover comprises a stop mechanism as to not permit extension of the seat rail cover over a maximum extension length. The stop mechanism may comprise a first stopper element at the first longitudinal section and a second stopper element at the second longitudinal section. The first and second stopper elements may be formed as to lie adjacent to each other or one on another in longitudinal direction of the seat rail cover in the maximum extended state.

The second support element may comprise a longitudinal rib or fin which extends along the second support element in longitudinal direction of the first second support element.

The first stopper element may be formed comb-shaped or with at least two teeth with a recess in between. In a mounted state of the seat rail cover, the longitudinal rib is located in the recess such that the first and second longitudinal sections can be moved with respect to each other in longitudinal direction of the seat rail cover.

The recess of the first stopper element extends in a transversal direction of the seat rail cover. In a mounted state of the seat rail cover, the teeth of the first stopper element are arranged in a z-direction above each other, i.e. with respect to the seat rail in a direction up or down with respect to a ground surface of a seat rail crown and are pointing towards the longitudinal rib. The z-direction substantially corresponds to an insertion or removal direction of the seat rail cover to or from a seat rail and is perpendicular to the longitudinal direction and transversal direction of the seat rail cover.

In this embodiment, the longitudinal rib is arranged in the recess between the teeth of the first stopper element. Therefore, the first and second support elements and thus the first and second longitudinal sections are mechanically coupled to each other such that a movement in z-direction of one of these elements with respect to the other one is prevented.

In the mounted state, the first and second longitudinal sections are mechanically coupled to each other such that these parts form the seat rail cover.

According to a further embodiment, the first and second support elements may be arranged adjacent to each other in the mounted state of the seat rail cover in the overlapping section in a direction transversal to the longitudinal section of the seat rail cover. In particular, the first and second support elements may contact one another in the mounted state in the overlapping section of the first and second support elements.

In this embodiment, the first and second support elements are arranged such that a movement of the support elements and the longitudinal sections of the seat rail cover is avoided in a transversal direction of the seat rail cover. In other words, the longitudinal sections of the seat rail cover are mechanically fixed with respect to each other in the transversal direction of the seat rail cover, in particular in a direction perpendicular to the longitudinal direction of the seat rail cover.

In other words, the support elements of the seat rail cover are formed such that a movement of one longitudinal section with respect to the other longitudinal section is permitted in longitudinal direction of the seat rail cover whereas a movement in transversal direction or in z-direction with respect to each other is prevented.

In one embodiment, the lateral edges of the second cover element may be bent around the first cover element. This embodiment may further improve the fixation of the longitudinal sections and the mechanical stability and rigidity with respect to each other in lateral direction and in z-direction whereas a longitudinal movement is permitted.

According to a further embodiment, the first support element and the second support element extend in longitudinal direction of the seat rail cover over the complete length of the seat rail cover.

According to a further embodiment, the first support element is arranged perpendicular to the first cover element and the second support element is arranged perpendicular to the second cover element.

In the mounted state of the seat rail cover, the first and second support elements extend into the crown of a seat rail, i.e. downwardly with respect to the floor of a passenger cabin.

According to a further embodiment, a longitudinal section of the first support element is spaced apart from the first cover element to form a gap and the second cover element is located in the gap and adapted for moving in longitudinal direction in the gap.

The first support element is spaced apart from the first cover element at least over a longitudinal section of the first cover element. When moving the second longitudinal section in longitudinal direction with respect to the first longitudinal section, the second cover element slides with respect to the first cover element through the gap between the first cover element and the first support element.

According to a further embodiment, a longitudinal section of the first support element is formed of a hollow body.

The first support element formed of a hollow body may provide a seat rail cover with a reduced weight and high mechanical strength.

According to a further embodiment, the first support element is mechanically attached to the first cover element by an attachment structure and the second cover element comprises a longitudinal recess in the second cover element for accommodating the attachment structure in a non extended state of the seat rail cover.

The attachment structure may be formed by a punctual or flat mechanical attachment of the first support element to the first cover element. When bringing or moving the first and second longitudinal section to the contracted state of the seat rail cover, the attachment structure moves into the recess in the second cover element and thus enables that the first and second longitudinal section overlap or completely overlap each other in longitudinal direction of the seat rail cover.

According to a further aspect, a seat arrangement for a passenger cabin of a means of transportation is provided. The seat arrangement comprises a seat rail, a first seat and a second seat adjacent to the first seat in longitudinal direction of the seat rail and a seat rail cover as described above and hereinafter. The seat rail cover is arranged as to cover a seat rail crown of the seat rail between the first seat and the second seat.

The means of transportation may be any one of a car, a bus, a train, a ship, or an aircraft. In other words, any means of transportation which are suitable for passenger transportation.

The seat rail cover may be mechanically reversibly attached to both the first and second seats. Thus, when moving one of the first and second seats in longitudinal direction of the seat rail, the seat rail cover automatically adjusts its length to the new distance between the first and second seat, be it shorter or longer than the previous length of the seat rail cover.

In one embodiment, the length of the first and second longitudinal sections is 10 inches (254 mm). Therefore, the minimum length of the seat rail cover is 10 inches (254 mm) and corresponds to the length of one of the first and second longitudinal section. The minimum length of the overlapping section may be 66 mm. In the fully extended state of the seat rail cover, the overlapping section has its minimum length and in the fully contracted state of the seat rail cover the overlapping section has its maximum length. Due to this minimum length of the overlapping section of 66 mm in this embodiment, the maximum length of the seat rail cover is 442 mm in the fully extended state.

According to an embodiment, the first support element and the second support element are arranged in the seat rail crown of the seat rail.

According to a further embodiment, the first longitudinal section is attached to a seat leg of the first seat.

According to a further embodiment, the second longitudinal section is attached to a seat leg of the second seat.

According to a further, aspect, an air craft is provided which comprises a seat arrangement as described above and hereinafter.

According to an embodiment, the seat arrangement is arranged in a passenger cabin of the air craft.

Exemplary embodiments of the seat rail cover will be elucidated with reference to the following drawings.

BRIEF DESCRIPTION OF THE DRAWINGS

The drawings are schematic and not to scale. Identical or similar reference signs relate to identical or similar elements.

DETAILED DESCRIPTION

Figure 1:
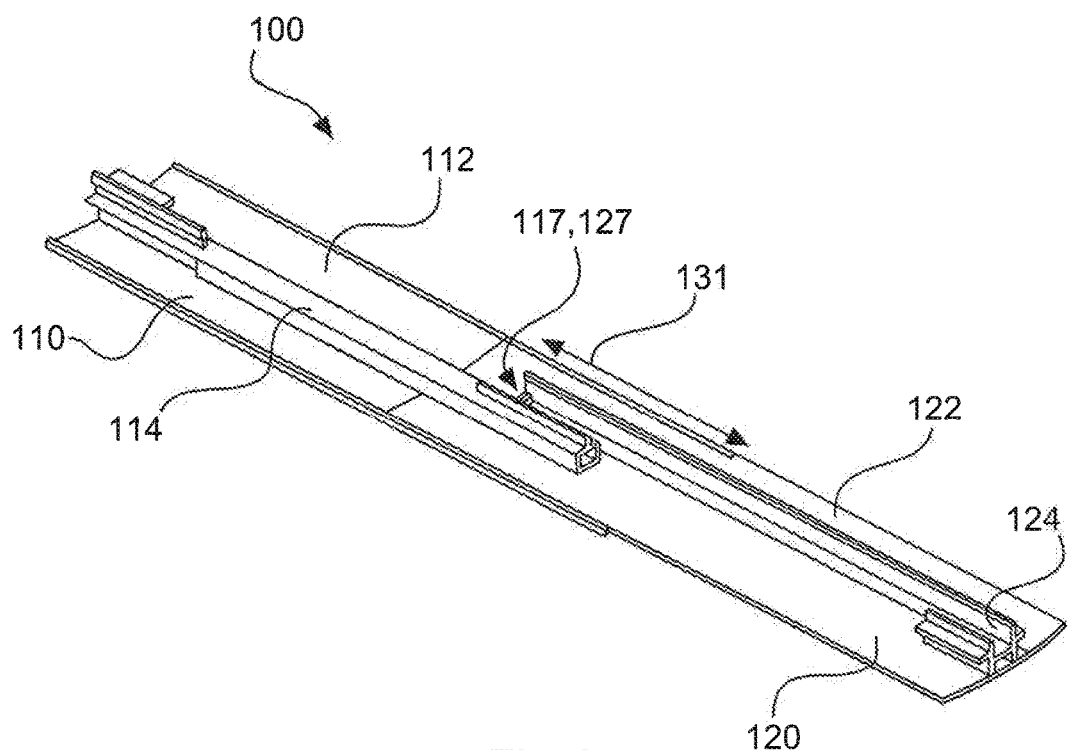
FIG. 1 illustrates an isometric view of the seat rail cover according to an exemplary embodiment in an extended state.

FIG. 1 illustrates a seat rail cover 100 with a first longitudinal section 110 and a second longitudinal section 120. The first longitudinal section 110 comprises a first cover element 112 and a first support element 114. The second longitudinal section 120 comprises a second cover element 122 and a second support element 124.

The first support element 114 extends in longitudinal direction of the seat rail cover 100 along the first longitudinal section 110 and the second support element 124 extends in longitudinal direction of the seat rail cover 100 along the second longitudinal section 120.

The seat rail cover 100 illustrated in FIG. 1 is shown in the maximally extended state. In this state, the first and second cover elements 110, 120 as well as the first and second support elements 114, 124 overlap in longitudinal direction of the seat rail cover 100.

In sum, the first and second support element 114, 124 extend along the complete length of the seat rail cover 100. Thus, the complete length of the seat rail cover is supported by the first and second support elements 114, 124 with respect to a seat rail crown of a seat rail, except for the longitudinal extension of the gap between the first support element 114 and the first cover element 112, which is described below with regard to FIG. 4.

The first support element 114 is formed with a hollow cuboid. The first support element 114 and the first cover element 112 are spaced apart such that the second cover element 122 is movable in longitudinal direction of the seat rail cover between the first support element 114 and the first cover element 112.

In the contracted state of the seat rail cover, the first support element 114 and the second support element 124 extend side by side to each other in longitudinal direction of the seat rail cover. In the extended state of the seat rail cover, the first and second support element 114, 124 extend side by side to each other in an overlapping section 131 of the first cover element and the second cover element.

In the contracted state of the seat rail cover, the overlapping section 131 of the first and second cover elements extends along the complete length of the first and second cover element, in case these elements have the same length.

Figure 2:
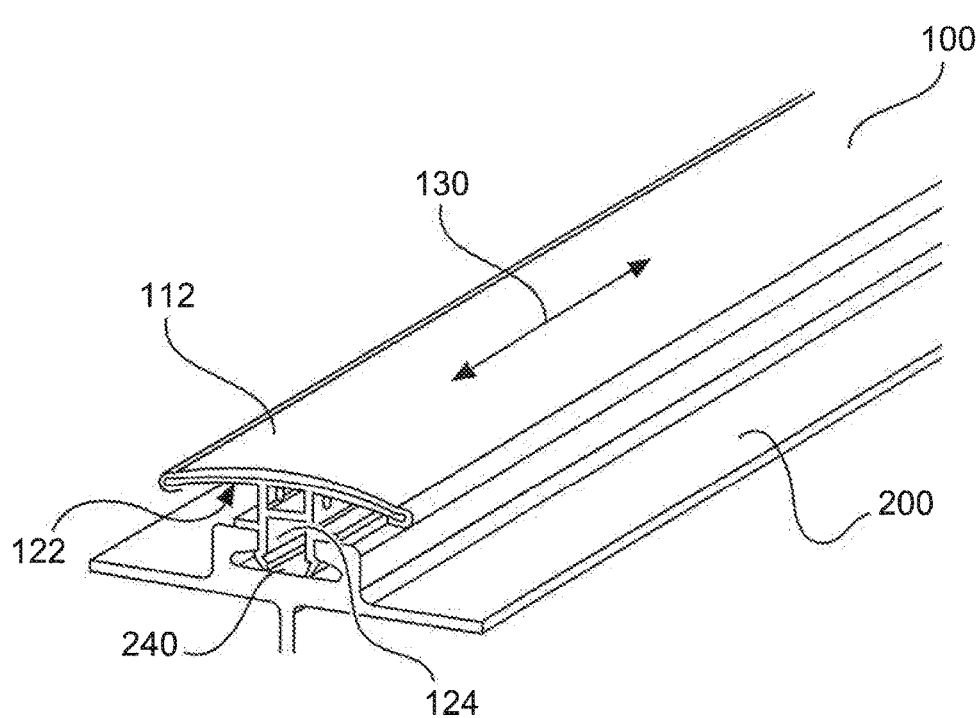
FIG. 2 illustrates an isometric view of the seat rail cover according to an exemplary embodiment in a state mounted to a seat rail.

FIG. 2 illustrates the seat rail cover 100 in a contracted state and mounted to a seat rail crown 240. The first cover element 112 overlaps the second cover element 122. The first and second support elements are arranged in the seat rail crown 240 which is formed as a longitudinal slot extending in longitudinal direction 130 of the seat rail 200.

The seat rail crown 240 is substantially C-shaped and has two projections which are arranged opposite to the floor area of the seat rail crown. Between the two projections, an opened slot permits the insertion of the seat rail cover.

The distance between the two projections of the seat rail crown and the width of the first and second support elements may be dimensioned such that the length of the seat rail cover can be adapted in the mounted state, i.e. the friction between the projections of the seat rail crown and the first and second support elements permits a longitudinal movement of at least one of the first and second support element in the mounted state.

In case such a longitudinal movement of one of the first and second support element in the mounted state is not desired, the width of the first and second support element may be increased which would lead to an increased friction in the mounted state between the support elements and the projections of the seat rail crown. However, the seat rail cover and the seat rail may be form locked or friction locked.

Figure 3:
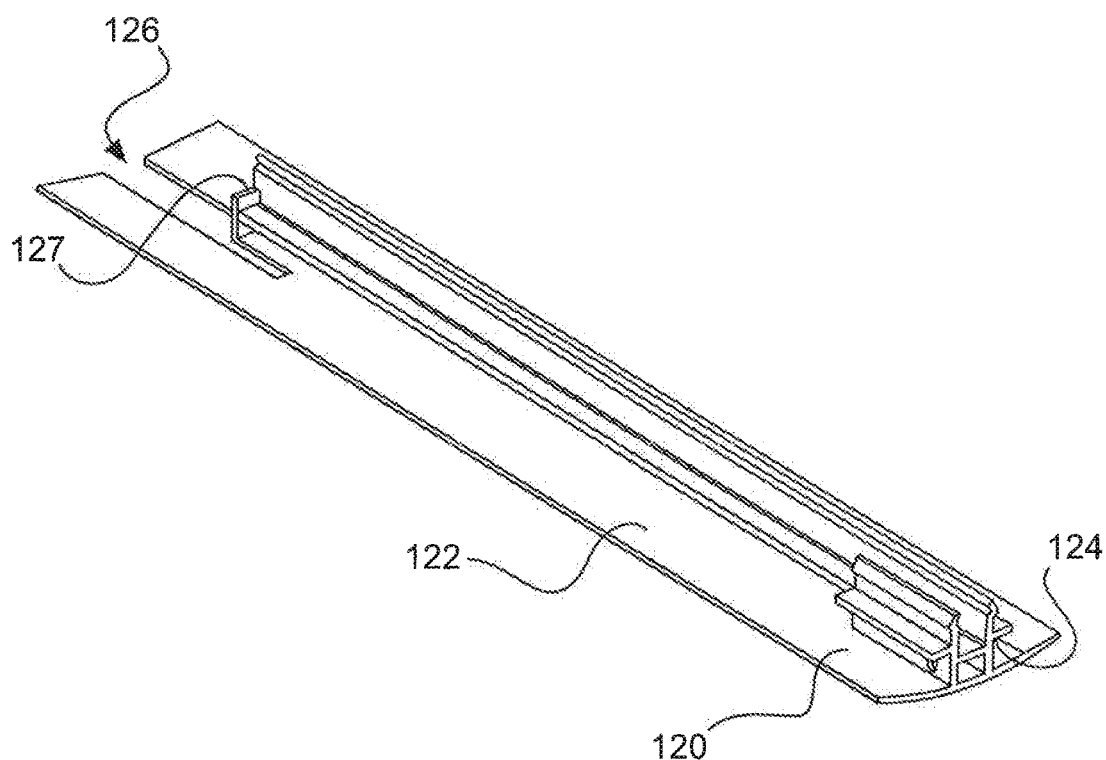
FIG. 3 illustrates an isometric view of a second longitudinal section of a seat rail cover according to an exemplary embodiment.
Figure 4:
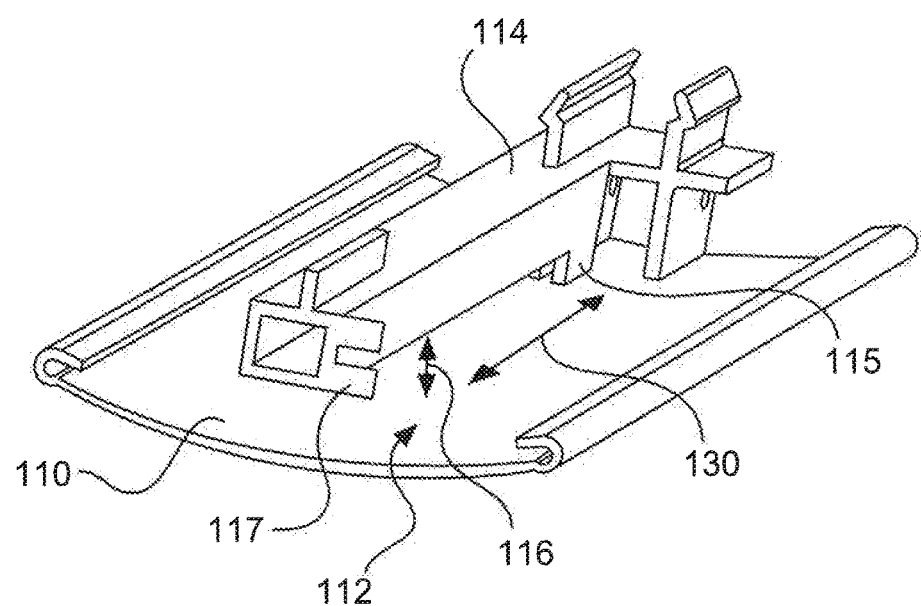
FIG. 4 illustrates an isometric view of a first longitudinal section of a seat rail cover according to an exemplary embodiment.

As to not extend the seat rail cover beyond a maximum longitudinal extension, the seat rail cover comprises a stop mechanism. This stop mechanism is illustrated in FIGS. 3 and 4 and requires an interaction between the first and second support element.

At the second support element 124 of the second longitudinal section 120, a second stopper element 127 is arranged.

The counterpart of the second stopper element 127 is the first stopper element 117 arranged at the first support element 114 of the first longitudinal section 110.

The first and second stopper elements 117, 127 may also be arranged at the cover elements of the first longitudinal section and second longitudinal section.

The maximum extended state of the seat rail cover is determined by the positions of the first and second stopper elements. The maximum extended state is reached when the stopper elements mesh with each other or engage with each other such that no further extension movement is possible.

In the example shown in FIGS. 3 and 4, the first and second stopper elements are formed with two lateral projections which are extending from one of the first and second support element towards the other one of the first and second support element, respectively. In the maximum extended state, the first stopper element engages with the second stopper element and prevents further longitudinal extension of the seat rail cover.

In the right hand corner of FIG. 3, the second end section of the second longitudinal section is shown having a support element with two support ribs which are arranged symmetric with regard to the longitudinal direction of the second longitudinal direction. Further to the left, the second support element is formed of a single support rib, i.e., is formed asymmetric with regard to the longitudinal direction and in particular with regard to a longitudinal axis of the second cover element of the second longitudinal section provided that none of the ribs is attached in the centre of the second cover element.

Similarly, in the right hand upper corner of FIG. 4, the first end section of the first longitudinal section is shown having a symmetric section of the first support element. Further on in longitudinal direction towards the left hand lower corner of FIG. 3, the first support element is formed with a hollow cuboid which is arranged asymmetrically with regard to the longitudinal axis of the first cover element.

As shown in FIG. 1, the asymmetric sections of the first and second support elements overlap in longitudinal direction of the seat rail cover and they are located adjacent, in particular are immediately or directly adjacent, to each other in transversal direction of the seat rail cover.

When mounting the first and second longitudinal sections to a seat rail cover, the first support element may be elastically bent or turned such that the first stopper element can pass the second stopper element. Subsequently, the first support element will take its initial position, i.e. before bending it away from the second support element, and when extending the seat rail cover now, the first and second stopper element do not permit passing each other.

In the mounted state of the seat rail cover, a lateral movement of one of the first and second support element with respect to the other one of the first and second support element is not possible as both these elements are located in the seat rail crown. Thus, in the mounted state, the longitudinal extension of the seat rail cover cannot go beyond the maximum length defined by the positions of the first and second stopper elements.

The seat rail cover may be made of elastically deformable material, such as plastic, for example.

In the mounted state, the first and second support element may extend towards the floor or ground surface of the seat rail crown such that a load dispersion of loads applied from the passenger cabin to the cover elements 112, 122 into the seat rail crown is achieved.

Figure 5:
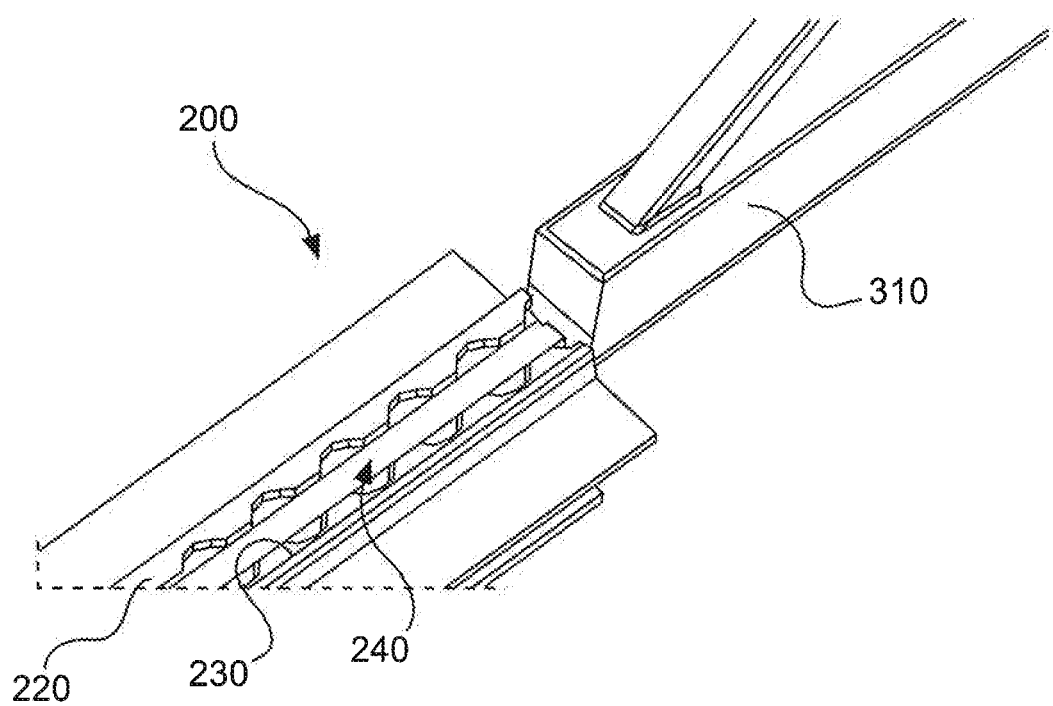
FIG. 5 illustrates an isometric view of a seat arrangement.

FIG. 5 illustrates a seat rail 200 having a seat rail crown 240. A first projection 220 and a second projection 230 are arranged on an upper surface of the seat rail, i.e. pointing towards a passenger cabin or arranged at a level of the floor of the passenger cabin. The seat rail cover is located in the seat rail crown between the projections 220, 230.

A seat leg 310 is arranged in the crown of the seat rail and is movable in longitudinal direction of the seat rail.

Figure 6:
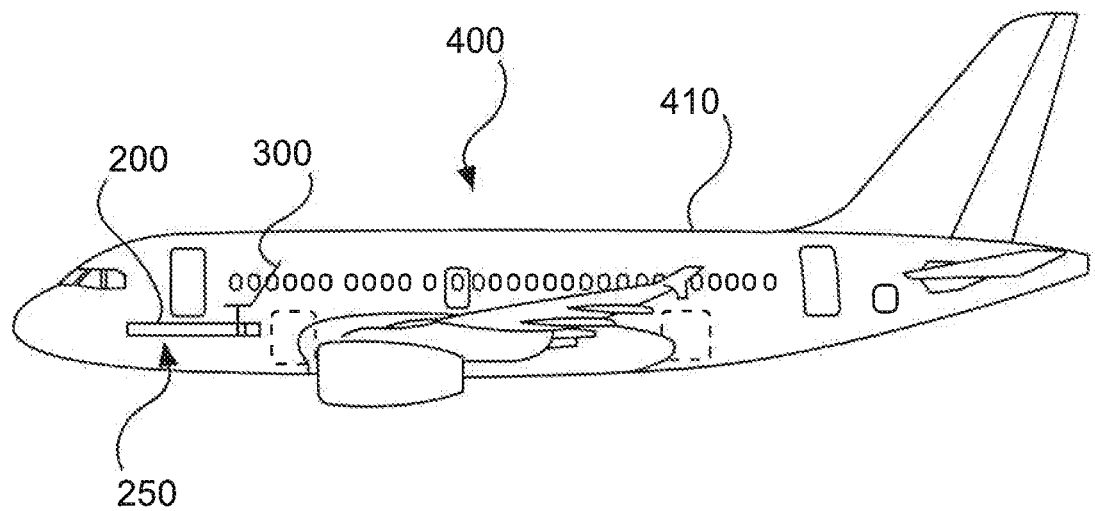
FIG. 6 illustrates a schematic view of an aircraft according to an exemplary embodiment.

FIG. 6 illustrates an aircraft 400 with a seat arrangement 250 with a seat rail 200 and a multitude of seats of which only one seat 300 is shown. The seat arrangement 250 is arranged in a passenger cabin 410 of the aircraft 400.

LIST OF REFERENCE SIGNS 100 seat rail cover
110 first longitudinal section
112 first cover element
114 first support element
115 attachment structure
116 gap
117 first stopper element
120 second longitudinal section
122 second cover element
124 second support element
126 recess
127 second stopper element
130 longitudinal direction
131 overlapping section
200 seat rail
220 projection
230 projection
240 seat rail crown
250 seat arrangement
300 seat
310 seat leg
400 aircraft
410 passenger cabin

The invention claimed is:
1. A seat rail cover for a seat rail, the seat rail cover comprising:
  a first longitudinal section; and
  a second longitudinal section;
  wherein the first longitudinal section comprises a first cover element and a first support element;
  wherein the first support element extends in a longitudinal direction of the seat rail cover, has a first end and a second end, and protrudes from the first cover element transversely to the longitudinal direction,
  wherein the second longitudinal section comprises a second cover element and a second support element,
  wherein the second support element extends in longitudinal direction and protrudes from the second cover element transversely to the longitudinal direction, wherein the first longitudinal section is movable in longitudinal direction of the seat rail cover with respect to the second longitudinal direction from a non-extended state to an extended state, wherein the longitudinal section of the first support element is spaced apart from and does not contact the first cover element to form a gap, wherein the second cover element is located in the gap and adapted for moving in longitudinal direction in the gap and has a first end and a second end, wherein the first longitudinal section comprises an attachment structure mechanically interconnecting the first end of the first support element and the first cover element and wherein the gap is formed such that the second cover element moves towards or away from the attachment structure when moving the second longitudinal section relative to the first longitudinal section, and wherein the first end of the second cover element is configured to rest against the attachment structure only in the non-extended state of the seat rail cover and the attachment structure is arranged so as to stop a further longitudinal movement of the second cover element after reaching the non-extended state as a result of the first end of the second cover element resting against the attachment structure.

2. The seat rail cover according to claim 1, wherein the first support element and the second support element continuously extend in longitudinal direction of the seat rail cover.

3. The seat rail cover according to claim 1, wherein in the extended state the first support element and the second support element continuously extend in longitudinal direction of the seat rail cover.

4. The seat rail cover according to claim 1, wherein in the extended state the first support element and the second support element form an overlapping section in longitudinal direction of the seat rail cover.

5. The seat rail cover according to claim 1, wherein the first support element and the second support element extend in longitudinal direction of the seat rail cover over the complete length of the seat rail cover.

6. The seat rail cover according to claim 1, wherein the first support element is arranged perpendicular to the first cover element; and
wherein the second support element is arranged perpendicular to the second cover element.

7. The seat rail cover according to claim 1, wherein a longitudinal section of the first support element is formed of a hollow body.

8. The seat rail cover according to claim 1,
wherein the first support element is mechanically attached to the first cover element by an attachment structure;
wherein the second cover element comprises a longitudinal recess for accommodating the attachment structure in a non-extended state of the seat rail cover.

9. A seat arrangement for a passenger cabin of a means of transportation, the seat arrangement comprising:
a seat rail;
a first seat and a second seat adjacent to the first seat in longitudinal direction of the seat rail;
a seat rail cover;
wherein the seat rail cover is arranged as to cover a seat rail crown of the seat rail between the first seat and the second seat;
wherein the seat rail cover comprises:
a first longitudinal section; and
a second longitudinal section;
wherein the first longitudinal section comprises a first cover element and a first support element,
wherein the first support element extends in a longitudinal direction of the seat rail cover, has a first end and a second end, and protrudes from the first cover element transversely to the longitudinal direction,
wherein the second longitudinal section comprises a second cover element and a second support element,
wherein the second support element extends in longitudinal direction and protrudes from the second cover element transversely to the longitudinal direction,
wherein the first longitudinal section is movable in longitudinal direction of the seat rail cover with respect to the second longitudinal direction from a non-extended state to an extended state,
wherein the longitudinal section of the first support element is spaced apart from and does not contact the first cover element to form a gap,
wherein the second cover element is located in the gap and adapted for moving in longitudinal direction in the gap and has a first end and a second end,
wherein the first longitudinal section comprises an attachment structure mechanically interconnecting the first end of the first support element and the first cover element and wherein the gap is formed such that the second cover element moves towards or away from the attachment structure when moving the second longitudinal section relative to the first longitudinal section, and
wherein the first end of the second cover element is configured to rest against the attachment structure only in the non-extended state of the seat rail cover and the attachment structure is arranged so as to stop a further longitudinal movement of the second cover element after reaching the non-extended state as a result of the first end of the second cover element resting against the attachment structure.

10. The seat arrangement according to claim 9, wherein the first support element and the second support element are arranged in the seat rail crown of the seat rail.

11. The seat arrangement according to claim 9, wherein the first longitudinal section is attached to a seat leg of the first seat.

12. The seat arrangement according to claim 9, wherein the second longitudinal section is attached to a seat leg of the second seat.

13. An air craft, comprising a seat arrangement;
wherein the seat arrangement comprises:
a seat rail;
a first seat and a second seat adjacent to the first seat in longitudinal direction of the seat rail;
a seat rail cover;
wherein the seat rail cover is arranged as to cover a seat rail crown of the seat rail between the first seat and the second seat;
wherein the seat rail cover comprises:
a first longitudinal section; and
a second longitudinal section;
wherein the first longitudinal section comprises a first cover element and a first support element,
wherein the first support element extends in a longitudinal direction of the seat rail cover, has a first end and a second end, and protrudes from the first cover element transversely to the longitudinal direction,
wherein the second longitudinal section comprises a second cover element and a second support element, wherein the second support element extends in longitudinal direction and protrudes from the second cover element transversely to the longitudinal direction, wherein the first longitudinal section is movable in longitudinal direction of the seat rail cover with respect to the second longitudinal direction from a non extended state to an extended state, wherein the longitudinal section of the first support element is spaced apart from and does not contact the first cover element to form a gap, wherein the second cover element is located in the gap and adapted for moving in longitudinal direction in the gap and has a first end and a second end, wherein the first longitudinal section comprises an attachment structure mechanically interconnecting the first end of the first support element and the first cover element and wherein the gap is formed such that the second cover element moves towards or away from the attachment structure when moving the second longitudinal section relative to the first longitudinal section, and wherein the first end of the second cover element is configured to rest against the attachment structure only in the non-extended state of the seat rail cover and the attachment structure is arranged so as to stop a further longitudinal movement of the second cover element after reaching the non-extended state as a result of the first end of the second cover element resting against the attachment structure.

14. The air craft according to claim 13, wherein the seat arrangement is arranged in a passenger cabin.

\* \* \* \* \*